United States Patent
Li et al.

(10) Patent No.: US 8,885,996 B2
(45) Date of Patent: Nov. 11, 2014

(54) OPTICAL DEVICE WITH A CMOS-COMPATIBLE ECHELLE GRATING

(75) Inventors: Guoliang Li, San Diego, CA (US); Ying L. Luo, San Diego, CA (US); Xuezhe Zheng, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 301 days.

(21) Appl. No.: 13/551,432

(22) Filed: Jul. 17, 2012

(65) Prior Publication Data

US 2014/0086585 A1 Mar. 27, 2014

(51) Int. Cl.
| | | |
|---|---|---|
| *G02B 6/34* | (2006.01) | |
| *H04J 14/02* | (2006.01) | |
| *G02B 6/293* | (2006.01) | |
| *G02B 6/26* | (2006.01) | |
| *G02B 6/122* | (2006.01) | |

(52) U.S. Cl.
CPC ............ *H04J 14/02* (2013.01); *G02B 6/29308* (2013.01); *G02B 6/2938* (2013.01); *G02B 6/1225* (2013.01)
USPC .............................................. 385/37; 385/31

(58) Field of Classification Search
CPC ........... G02B 6/29308; G02B 6/29326; G02B 6/29328; G02B 6/12007; G02B 6/2938; G02B 2006/12164; G02B 6/1225; G02B 2006/1213
USPC .......................................................... 385/37
See application file for complete search history.

(56) References Cited

U.S. PATENT DOCUMENTS

| | | | | |
|---|---|---|---|---|
| 6,968,096 | B2* | 11/2005 | Kittaka et al. | 385/10 |
| 7,397,987 | B2* | 7/2008 | Witzens et al. | 385/37 |
| 7,447,403 | B2* | 11/2008 | Kirk et al. | 385/37 |
| 7,515,790 | B2* | 4/2009 | Choi et al. | 385/36 |
| 7,821,691 | B2* | 10/2010 | Walter et al. | 359/2 |
| 8,175,430 | B2* | 5/2012 | Peng et al. | 385/37 |
| 2001/0012149 | A1* | 8/2001 | Lin et al. | 359/344 |
| 2008/0112669 | A1* | 5/2008 | Choi et al. | 385/36 |
| 2013/0039661 | A1* | 2/2013 | Luo et al. | 398/79 |
| 2013/0136389 | A1* | 5/2013 | Luo et al. | 385/11 |
| 2013/0195446 | A1* | 8/2013 | Zheng et al. | 398/34 |
| 2014/0086585 | A1* | 3/2014 | Li et al. | 398/87 |

OTHER PUBLICATIONS

Teng, Jie et al. "Athermal Silicon-on-insulator Ring Resonators by Overlaying a Polymer Cladding on Narrowed Waveguides", Aug. 17, 2009 / vol. 17, No. 17 / Optics Express 14627.
Luff, B. J. et al. "Silicon Photonic Filters for High Speed Data Transmission Applications", ECOC 2010, Sep. 19-23, 2010, Torino, Italy, 2010 IEEE.

(Continued)

*Primary Examiner* — Rhonda Peace
(74) *Attorney, Agent, or Firm* — Park, Vaughan, Fleming & Dowler LLP; Steven E. Stupp (57) ABSTRACT

An optical multiplexer/de-multiplexer (MUX/de-MUX) includes a two-dimensional pattern of features in a propagation region that conveys an optical signal having wavelengths. A given feature in this pattern has a characteristic length and the features have an average pitch, both of which are less than fundamental smallest of the wavelengths divided by an effective index of refraction of the propagation region. Moreover, an optical device in the optical MUX/de-MUX images and diffracts the optical signal using a reflective geometry, and provides the imaged and diffracted optical signal to output ports. For example, the optical device may include an echelle grating.

20 Claims, 6 Drawing Sheets

(56) References Cited

OTHER PUBLICATIONS

Feng, Dazeng et al. "Fabrication Insensitive Echelle Grating in Silicon-on-Insulator Platform", IEEE Photonics Technology Letters, vol. 23, No. 5, Mar. 1, 2011.

Levy, Uriel et al. "Inhomogenous Dielectric Metamaterials with Space-Variant Polarizability", Physical Review Letters, PRL 98, 243901 (2007) Week ending Jun. 15, 2007, The American Physical Society.

* cited by examiner

OPTICAL DEVICE WITH A CMOS-COMPATIBLE ECHELLE GRATING

GOVERNMENT LICENSE RIGHTS

This invention was made with United States government support under Agreement No. HR0011-08-9-0001 awarded by DARPA. The United States government has certain rights in the invention.

BACKGROUND

1. Field

The present disclosure generally relates to optical devices. More specifically, the present disclosure relates to an optical multiplexer/de-multiplexer (MUX/de-MUX) that includes a compact echelle grating and a two-dimensional, sub-wavelength pattern of features in a propagation region, which can make the optical MUX/de-MUX compatible with CMOS fabrication.

2. Related Art

Integrated silicon photonics is a promising new technology that provides a number of advantages for chip-level communication, such as very high index contrast and compatibility with CMOS fabrication technology. Ongoing research into integrated silicon photonics is focusing on opportunities to provide: low latency, high bandwidth, high density, and low power consumption. To date, several key active elements, including silicon lasers, modulators, and photodetectors, have been realized in silicon using low-cost CMOS-compatible processes. However, an ideal wavelength filter (such as an optical multiplexer/de-multiplexer or MUX/de-MUX), which can be used in wavelength division multiplexing (WDM), has not been developed yet.

In a high-data-rate WDM application, an ideal wavelength filter has: low loss, low crosstalk, a flat passband, accurate wavelength-channel alignment with minimal wavelength tuning, and a small footprint. In principle, a number of optical MUX/de-MUX designs can be integrated with CMOS circuits, including: arrayed waveguide gratings (AWGs), ring resonators, and planar concave gratings (echelle gratings). AWGs on silicon dioxide offer stability, low loss, low crosstalk, and do not require tuning. However, AWGs on silicon are typically sensitive to fabrication errors and temperature variations. In contrast, ring resonator-based wavelength filters can be very compact (for example, approximately 0.001 mm² per channel), and they can be fabricated using a CMOS-compatible process. However, ring resonators are often sensitive to fabrication errors and temperature variations, and thus typically require active tuning. In addition, a single ring can usually independently add or drop only one wavelength channel. As a consequence, a bank of ring resonators may be needed for a multi-channel WDM link.

Echelle gratings, which image and diffract optical signals, are particularly interesting because they can be designed to have: low optical crosstalk, fixed channel spacing, reduced tuning and monitoring requirements, and low on-chip optical loss. In addition, an echelle grating can simultaneously multiplex or demultiplex multiple channels; for example, up to 128 wavelength channels are possible.

However, echelle grating designs with high optical performance (such as low optical crosstalk and image aberrations) often have larger footprints. For example, image aberrations associated with grating facets far from the center of an echelle grating are one of the main contributors to optical crosstalk. As a consequence, wider entrance and exit apertures along the Rowland circle are usually required in order to reduce the input beam divergence in the free-propagation region of an echelle grating. In addition, smaller diffraction angles (less than 40°) are typically used to avoid illuminating grating facets further away from the center of the echelle grating. Given linear dispersion, these design choices result in a significantly longer focal length for the echelle grating; thus, the device size or footprint is significantly increased.

Increasing the size of echelle gratings usually increases the manufacturing cost. In addition, it is often difficult to fabricate larger echelle gratings using CMOS-compatible processes because the large bulk un-etched silicon slab in the echelle gratings violates CMOS design rules. In particular, by degrading the quality of the chemical-mechanical-polishing (CMP) process for the whole wafer, large echelle gratings are a significant yield risk to other devices on the wafer and, thus, are prohibited. This incompatibility with CMOS processes significantly increases the cost and complexity of using echelle gratings in integrated silicon photonics.

Hence, what is needed is an optical MUX/de-MUX that does not suffer from the above-described problems.

SUMMARY

One embodiment of the present disclosure provides an optical multiplexer/de-multiplexer (MUX/de-MUX). This optical MUX/de-MUX includes an input port that receives an optical signal having multiple wavelengths from an optical waveguide. Moreover, a propagation region in the optical MUX/de-MUX conveys the optical signal, where the propagation region includes a two-dimensional pattern of features in which a given feature has a characteristic length and the features have an average pitch, and where the characteristic length and the average pitch are less than the smallest of the wavelengths divided by an effective index of refraction of the propagation region. Furthermore, an optical device in the optical MUX/de-MUX images and diffracts the optical signal using a reflective geometry, and output ports that couple the imaged and diffracted optical signal to additional optical waveguides.

Note that the features may include: pillars and/or cavities defined by surfaces in the propagation region. For example, the cavities may include a material having a temperature coefficient of an opposite sign from a temperature coefficient of a material in the propagation region.

Moreover, on a length scale larger than the average pitch, a density of the features in the pattern of features may vary. This density variation may have a focusing effect on the optical signal.

Furthermore, an incidence angle associated with a diffraction order of the optical device may be different than a diffraction angle associated with the diffraction order. For example, the optical device may include a diffraction grating on a curved surface, such as an echelle grating.

In some embodiments, the optical MUX/de-MUX includes: a substrate; a buried-oxide layer disposed on the substrate; and a semiconductor layer disposed on the buried-oxide layer. This semiconductor layer may include the optical device. Additionally, the substrate may include a semiconductor.

Another embodiment provides a system that includes the optical MUX/de-MUX.

Another embodiment provides a method for multiplexing or de-multiplexing an optical signal, which may be performed by the optical MUX/de-MUX. During operation, the optical signal is received via an optical waveguide. Then, the optical signal is conveyed through the propagation region, where the propagation region includes the two-dimensional pattern of features in which the given feature has the characteristic length and the features have an average pitch, and where the characteristic length and the average pitch are less than the smallest of the wavelengths of the optical signal divided by the effective index of refraction of the propagation region. Moreover, the optical signal is imaged and diffracted using the optical device having the reflective geometry. Next, the imaged and diffracted optical signal is conveyed through the propagation region, and is output at the additional optical waveguides.

BRIEF DESCRIPTION OF THE FIGURES

Table 1 provides design parameters for an echelle grating in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an optical multiplexer/de-multiplexer (MUX/de-MUX), a system that includes the optical MUX/de-MUX, and a method for multiplexing or de-multiplexing an optical signal are described. This optical MUX/de-MUX includes a two-dimensional pattern of features in a propagation region that conveys an optical signal having one or more wavelengths. A given feature in this pattern has a characteristic length and the features have an average pitch, both of which are less than the smallest of the wavelengths divided by an effective index of refraction of the propagation region. Moreover, an optical device in the optical MUX/de-MUX images and diffracts the optical signal using a reflective geometry, and provides a diffraction order to one or more output ports. For example, the optical device may include an echelle grating.

By incorporating the pattern of features, the optical MUX/de-MUX may be compatible with CMOS design rules and, thus, a CMOS fabrication process. This may significantly reduce the cost and complexity of using the optical MUX/de-MUX in integrated silicon photonics, such as in a wavelength-division-multiplexing (WDM) interconnect or link. In addition, by including a material in the features having a temperature coefficient of an opposite sign from a temperature coefficient of a material in the propagation region, an optical MUX/de-MUX that is insensitive to temperature changes can be fabricated, thereby reducing or eliminating the need for thermal tuning. This may reduce the power consumption and complexity of the optical MUX/de-MUX.

Figure 1:
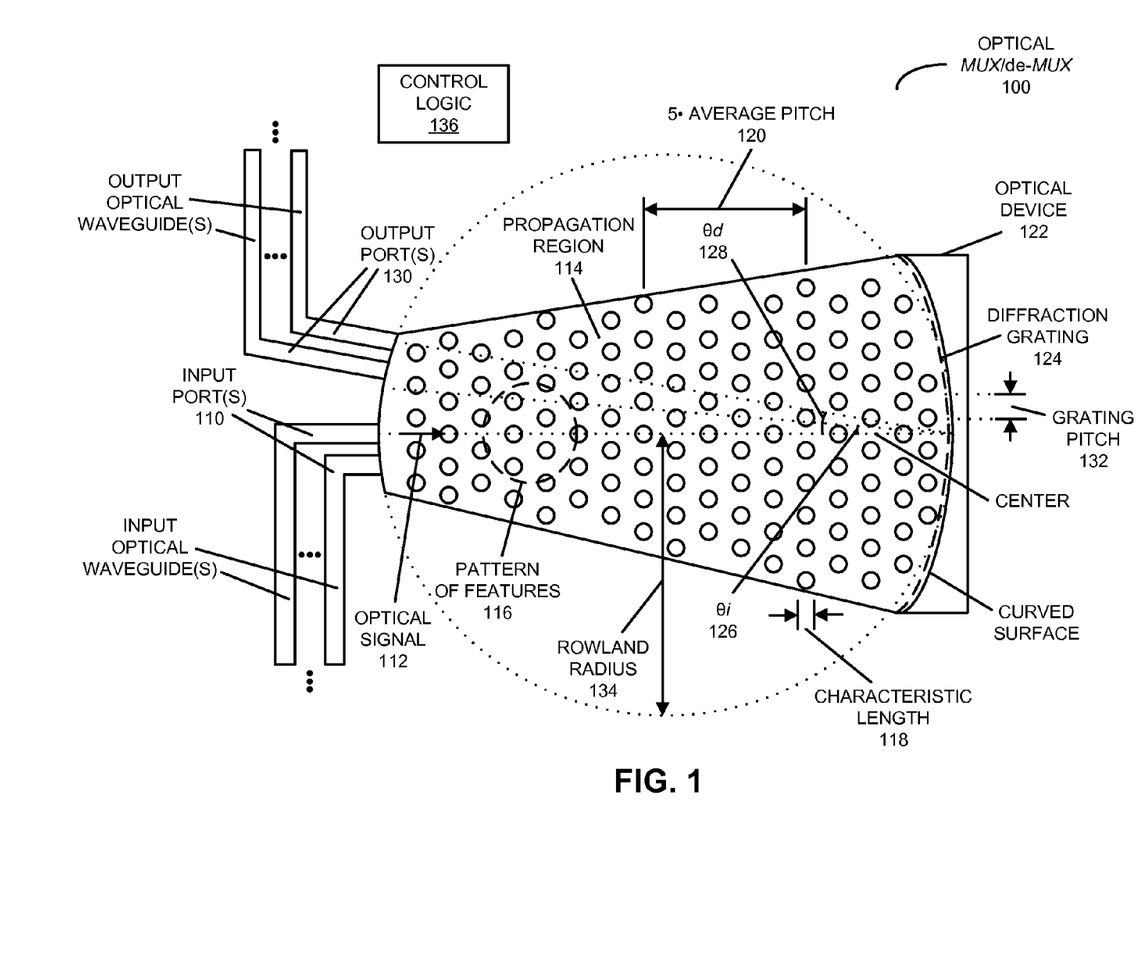
FIG. 1 is a block diagram illustrating a top view of an optical multiplexer/de-multiplexer (MUX/de-MUX) in accordance with an embodiment of the present disclosure.

We now describe embodiments of the optical MUX/de-MUX, which can be used to multiplex (i.e., route a smaller number of inputs to a larger number of outputs) or de-multiplex (i.e., route a larger number of inputs to a smaller number of outputs) one or more optical signals. FIG. 1 presents a block diagram illustrating a top view of optical MUX/de-MUX 100. This optical MUX/de-MUX includes one or more input ports 110 that receive one or more optical signals, such as an optical signal 112 having one or more wavelengths λs (for example, via one or more input optical waveguides). For example, optical signal 112 may be associated with a predefined channel spacing (such as those used in WDM).

Moreover, optical MUX/de-MUX 100 includes a propagation region 114 that conveys optical signal 112. This propagation region includes a two-dimensional pattern of features 116 in which a given feature has a characteristic length 118 and the features have an average pitch 120, both of which are less than the smallest of the λs divided by an effective index of refraction n of propagation region 114. The input light passing through propagation region 114 may experience the smoothed-out, averaged optical properties of pattern of features 116. Thus, propagation region 114 may be represented as a locally homogenous effective medium with optical properties that are determined by the geometry of pattern of features 116 (in particular, n may be slightly reduced relative to that of a propagation region without pattern of features 116). However, because average pitch 120 is smaller than the smallest of the λs/n (i.e., pattern of features 116 is a sub-wavelength pattern), the relative phase of the input light across a wavefront may not be altered by pattern of features 116. Instead, pattern of features 116 may ensure that there are no contiguous areas in propagation region 114 that are larger than the smallest of the λs/n, which may prevent CMOS-rule violations associated with chemical mechanical polishing during fabrication. Thus, pattern of features 116 may help ensure that optical MUX/de-MUX 100 is compatible with CMOS-fabrication processes.

Furthermore, optical MUX/de-MUX 100 includes optical device 122 that images and diffracts optical signal 112 using a reflective geometry so that different diffraction orders of optical device 122 propagate through propagation region 114, and which provides diffraction orders to one or more output ports 130 (which may include one or more output optical waveguides). For example, optical device 122 may include a diffraction grating 124 on a curved surface having a radius of twice Rowland radius 134, such as an echelle grating. Thus, an incidence angle ($\theta_i$) 126 associated with a diffraction order may be different than a diffraction angle ($\theta_d$) 128 associated with the diffraction order. Note that grating pitch 132 of diffraction grating 124 may be greater than or equal to 20 µm and/or Rowland radius 134 may be less than 1 mm.

In an exemplary embodiment, pattern of features 116 may have cylindrical or square symmetry. Moreover, characteristic length 118 may be one-half of average pitch 120 (i.e., a 50% duty cycle). For example, characteristic length 118 may be 100 nm and average pitch 120 may be 200 nm.

Figure 2:
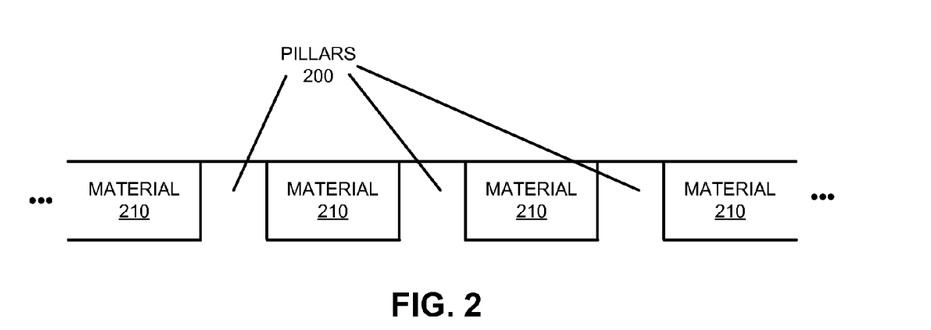
FIG. 2 is a block diagram illustrating a side view of features in the optical MUX/de-MUX of FIG. 1 in accordance with an embodiment of the present disclosure.
Figure 3:
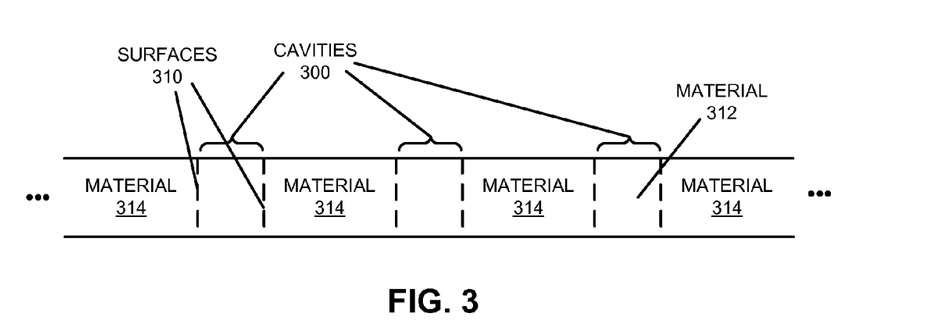
FIG. 3 is a block diagram illustrating a side view of features in the optical MUX/de-MUX of FIG. 1 in accordance with an embodiment of the present disclosure.

As shown in FIG. 2, features in pattern of features 116 (FIG. 1) may include pillars 200. Regions between pillars 200 may be filled with a material 210, such as silicon dioxide. Alternatively or additionally, as shown in FIG. 3, features in pattern of features 116 (FIG. 1) may include cavities 300 defined by surfaces 310 in propagation region 114 (FIG. 1). These cavities may be filled with a material 312, such as silicon dioxide.

In some embodiments, material 312 has a temperature coefficient with an opposite sign from a temperature coefficient of a material 314 in propagation region 114 (FIG. 1). For example, material 312 (such as polyimide or a polymer) may have a negative temperature coefficient, in contrast with the temperature coefficient of silicon ($1.86 \times 10^{-4}$ K$^{-1}$). This may reduce or eliminate the temperature dependence of optical MUX/de-MUX 100 (FIG. 1), and thus the need for thermal tuning. Alternatively or additionally, material 312 may be an electro-optical material (such as an electro-optical polymer) so that optical MUX/de-MUX 100 (FIG. 1) can be electrically tuned (for example, using control logic 136 in FIG. 1).

Figure 4:
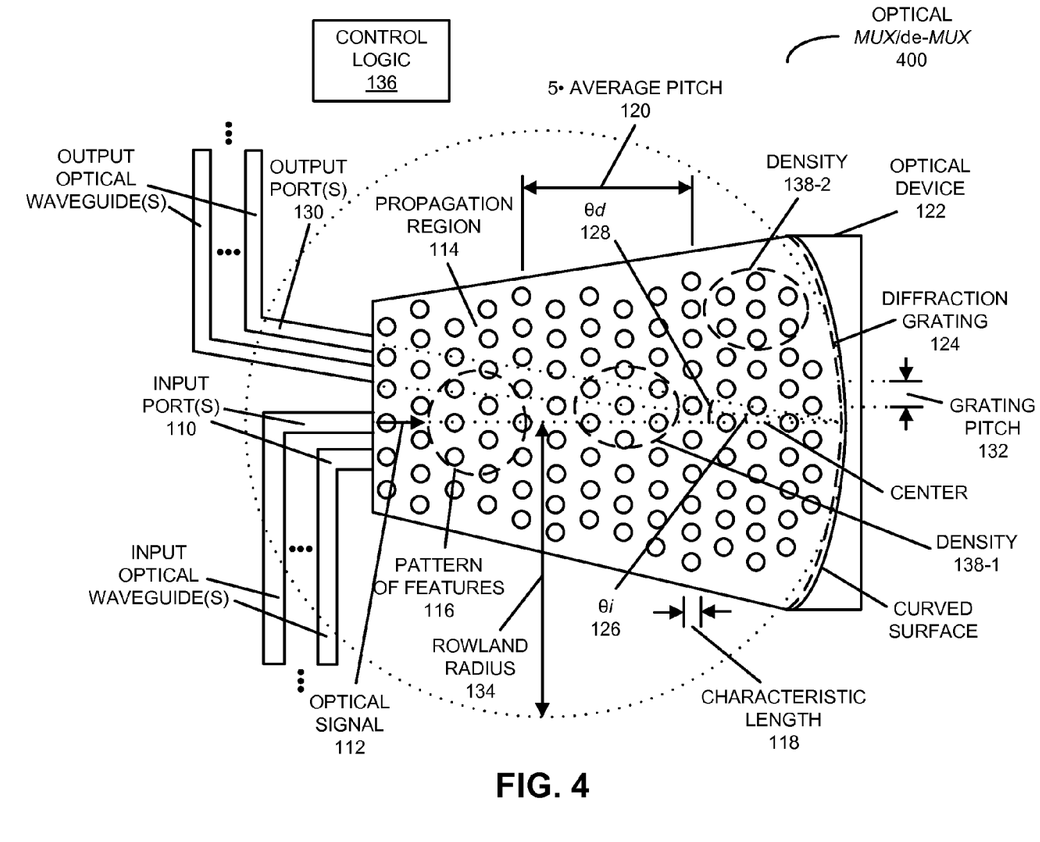
FIG. 4 is a block diagram illustrating a top view of an optical MUX/de-MUX in accordance with an embodiment of the present disclosure.

As shown in FIG. 4, which presents a block diagram illustrating a top view of optical MUX/de-MUX 400, in some embodiments densities 138 of the features in pattern of features 116 may vary. This density variation (which may define a nanophotonic, two-dimensional pattern) may have a focusing effect on optical signal 112 (i.e., it may magnify optical signal 112 and, thus, may reduce the divergence of optical signal 112 in propagation region 114), which may reduce the size of optical MUX/de-MUX 100. In particular, because diffraction grating 124 is defined on a concave mirror, optical signal 112 is reflected and refocused onto one or more output ports 130. Thus, optical device 122 is equivalent to a positive lens. By changing densities 138 of pattern of features 116 (for example, in one or two dimensions), the wavefront phase properties of the incident light beam can be sculpted as if there were another positive lens. Therefore, a compound (positive-positive) lens combination may be obtained with an effective focal length that is much smaller than Rowland radius 134, without adversely impacting the performance of optical MUX/de-MUX 400. This can facilitate a significant reduction in the size of optical device 122. For example, a 5× footprint reduction can be achieved.

Figure 5:
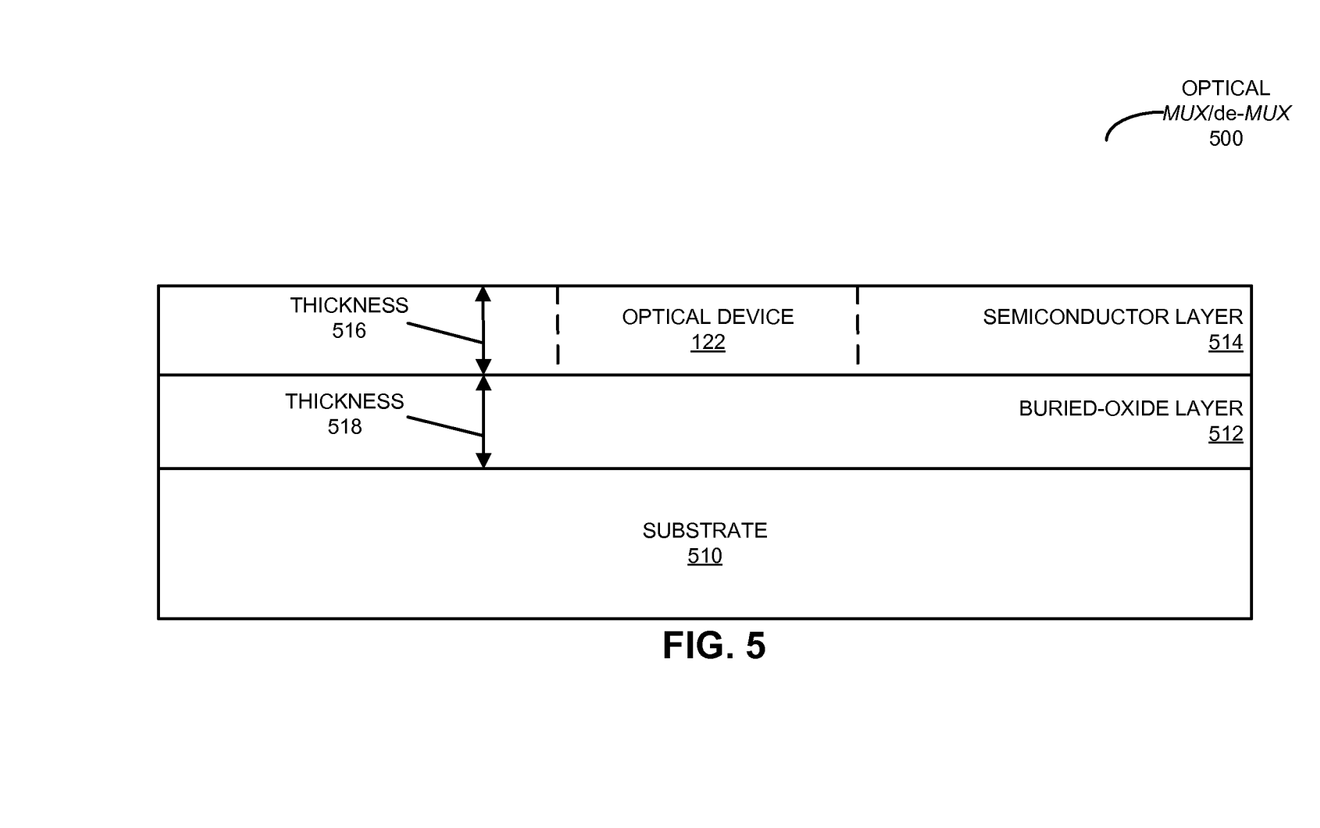
FIG. 5 is a block diagram illustrating a side view of the optical MUX/de-MUX of FIG. 1 or 4 in accordance with an embodiment of the present disclosure.

The optical MUX/de-MUX may be implemented using silicon-on-insulator (SOI) technology. This is illustrated in FIG. 5, which presents a block diagram illustrating a side view of an optical MUX/de-MUX 500. In particular, optical MUX/de-MUX 500 may include: a substrate 510; a buried-oxide layer 512 disposed on substrate 510; and a semiconductor layer 514 disposed on buried-oxide layer 512, whereat least optical device 122 is included in semiconductor layer 514. For example, substrate 510 and/or semiconductor layer 514 may include a semiconductor, such as silicon.

In an exemplary embodiment, optical signal 112 (FIG. 1) has wavelengths between 1.1-1.7 µm, such as an optical signal having a fundamental λ of 1.3 or 1.55 µm. Moreover, semiconductor layer 514 may have a thickness 516 that is less than 1 µm (such as 0.25-0.3 µm). Furthermore, buried-oxide layer 512 may have a thickness 518 between 0.3 and 3 µm (such as 0.8 µm).

The parameters for an exemplary design of an echelle grating are provided in Table 1. Furthermore, average pitch 120 of pattern of features 116 (FIGS. 1 and 4) may be 100-300 nm.

TABLE 1

| Channel count | 8 |
| Channel spacing (nm) | 1.6 |
| Optical crosstalk (dB) | 20-25 |
| Footprint (µm$^2$) | 500 × 200 |
| Insertion loss | <3 dB |
| Carrier wavelength (nm) | 1550 |

TABLE 1-continued

| Free Spectral Range (nm) | 12.8 |
| Thickness 516 (nm) | 300 |
| Diffraction order | 90 |
| Grating pitch 132 (µm) | 25 |

Figure 6:
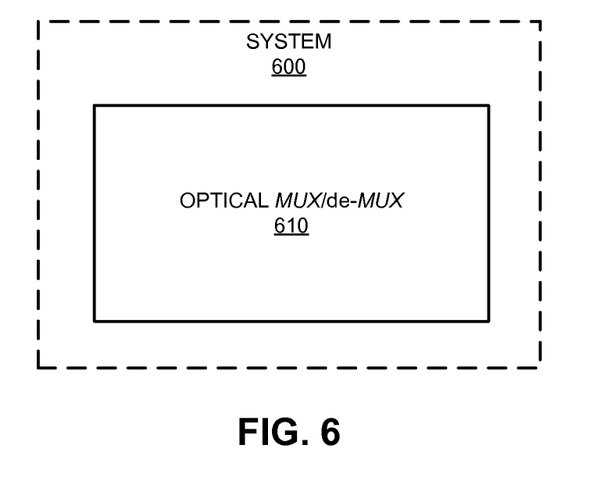
FIG. 6 is a block diagram illustrating a system that includes the optical MUX/de-MUX of FIG. 1 or 4 in accordance with an embodiment of the present disclosure.

The optical MUX/de-MUX may be used in a variety of applications. This is shown in FIG. 6, which presents a block diagram illustrating a system 600 that includes optical MUX/de-MUX 610, such as optical MUX/de-MUX 100 (FIG. 1), optical MUX/de-MUX 400 (FIG. 4) and/or optical MUX/de-MUX 500 (FIG. 5). System 600 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Note that a given computer system may be at one location or may be distributed over multiple, geographically dispersed locations.

Moreover, optical MUX/de-MUX 100 (FIG. 1), optical MUX/de-MUX 400 (FIG. 4) and/or optical MUX/de-MUX 500 (FIG. 5), as well as system 600, may include fewer components or additional components. For example, there may be additional input ports and/or output ports in optical MUX/de-MUX 100 (FIG. 1), optical MUX/de-MUX 400 (FIG. 4) and/or optical MUX/de-MUX 500 (FIG. 5). Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the integrated circuits and the system may be implemented more in hardware and less in software, or less in hardware and more in software, as is known in the art.

Figure 7:
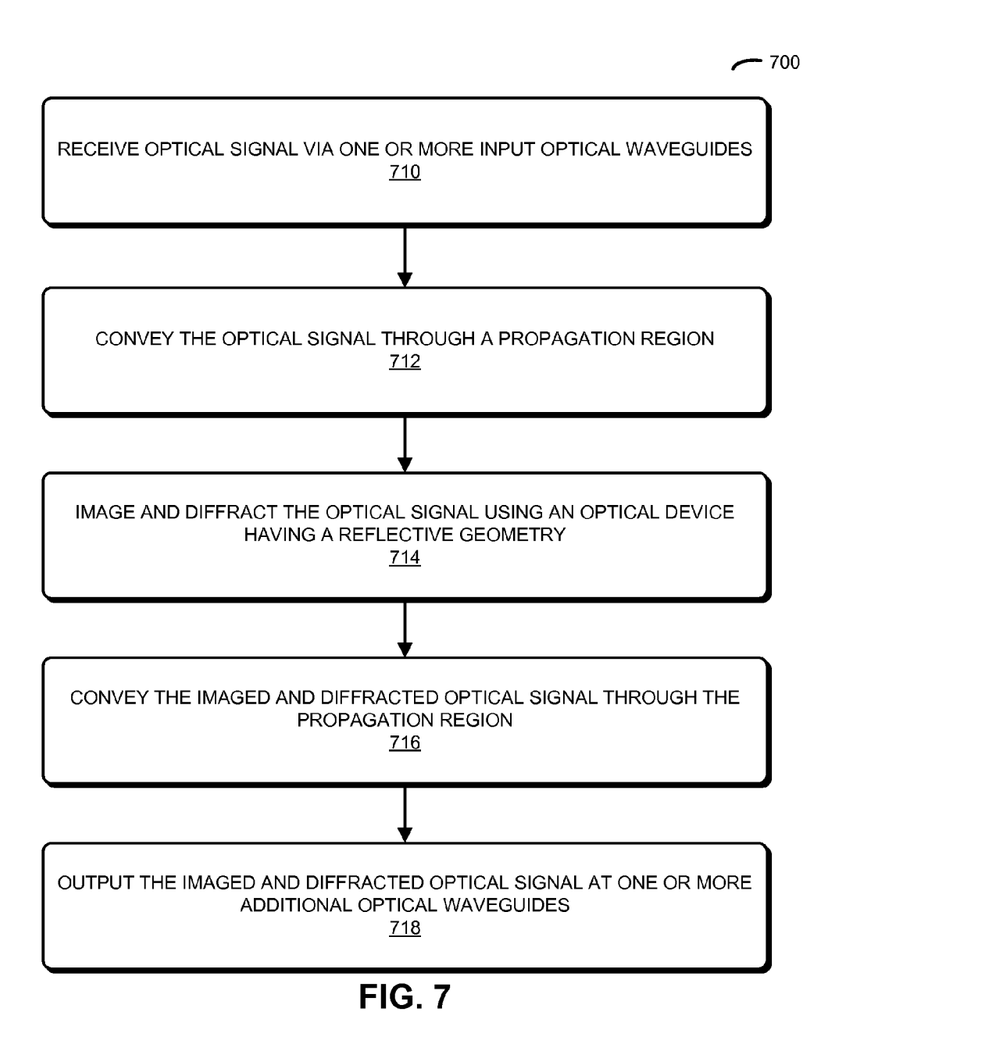
FIG. 7 is a flow chart illustrating a method for multiplexing or de-multiplexing an optical signal in accordance with an embodiment of the present disclosure.

We now describe embodiments of the method. FIG. 7 presents a flow chart illustrating a method 700 for multiplexing or de-multiplexing an optical signal, which may be performed by optical MUX/de-MUX 100 (FIG. 1), optical MUX/de-MUX 400 (FIG. 4) and/or optical MUX/de-MUX 500 (FIG. 5). During operation, the optical signal is received via one or more optical waveguides (operation 710). Then, the optical signal is conveyed through the propagation region (operation 712), where the propagation region includes the two-dimensional pattern of features in which the given feature has the characteristic length and the features have an average pitch, and where the characteristic length and the average pitch are less than the fundamental wavelength of the optical signal divided by the effective index of refraction of the propagation region. Moreover, the optical signal is imaged and diffracted using the optical device having the reflective geometry (operation 714). Next, the imaged and diffracted optical signal is conveyed through the propagation region (operation 716), and is output at one or more additional optical waveguides (operation 718).

In some embodiments of method 700 there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical multiplexer/de-multiplexer (MUX/de-MUX), comprising:
   an input port configured to couple to an optical waveguide to receive an optical signal having multiple wavelengths;
   a propagation region configured to convey the optical signal, wherein the propagation region includes a two-dimensional pattern of features in which a given feature has a characteristic length and the features have an average pitch, and wherein the characteristic length and the average pitch are less than fundamental smallest of the wavelengths divided by an effective index of refraction of the propagation region;
   an optical device configured to image and diffract the optical signal using a reflective geometry; and
   output ports configured to couple the imaged and diffracted optical signal to additional optical waveguides.

2. The optical MUX/de-MUX of claim 1, wherein the features include pillars.

3. The optical MUX/de-MUX of claim 1, wherein the features include cavities defined by surfaces in the propagation region.

4. The optical MUX/de-MUX of claim 3, wherein the cavities include a material having a temperature coefficient of an opposite sign from a temperature coefficient of a material in the propagation region.

5. The optical MUX/de-MUX of claim 1, wherein, on a length scale larger than the average pitch, a density of the features in the pattern of features varies; and
   wherein the density variation has a focusing effect on the optical signal.

6. The optical MUX/de-MUX of claim 1, wherein an incidence angle associated with a diffraction order of the optical device is different than a diffraction angle associated with the diffraction order.

7. The optical MUX/de-MUX of claim 1, wherein the optical device includes a diffraction grating on a curved surface.

8. The optical MUX/de-MUX of claim 1, wherein the optical device includes an echelle grating.

9. The optical MUX/de-MUX of claim 1, further comprising:
   a substrate;
   a buried-oxide layer disposed on the substrate; and
   a semiconductor layer disposed on the buried-oxide layer, wherein the optical device is included in the semiconductor layer.

10. The optical MUX/de-MUX of claim 9, wherein the substrate includes a semiconductor.

11. A system, comprising:
    a processor;
    a memory storing a program module that is configured to be executed by the processor; and
    an optical MUX/de-MUX, wherein the optical MUX/de-MUX includes:
       an input port configured to couple to an optical waveguide to receive an optical signal having multiple wavelengths;
       a propagation region configured to convey the optical signal, wherein the propagation region includes a two-dimensional pattern of features in which a given feature has a characteristic length and the features have an average pitch, and wherein the characteristic length and the average pitch are less than fundamental smallest of the wavelengths divided by an effective index of refraction of the propagation region;
       an optical device configured to image and diffract the optical signal using a reflective geometry; and
       an output port configured to couple the imaged and diffracted optical signal to additional optical waveguides.

12. The system of claim 11, wherein the features include pillars.

13. The system of claim 11, wherein the features include cavities defined by surfaces in the propagation region.

14. The system of claim 13, wherein the cavities include a material having a temperature coefficient of an opposite sign from a temperature coefficient of a material in the propagation region.

15. The system of claim 11, wherein, on a length scale larger than the average pitch, a density of the features in the pattern of features varies; and
    wherein the density variation has a focusing effect on the optical signal.

16. The system of claim 11, wherein an incidence angle associated with a diffraction order of the optical device is different than a diffraction angle associated with the diffraction order.

17. The system of claim 11, wherein the optical device includes a diffraction grating on a curved surface.

18. The system of claim 11, wherein the optical device includes an echelle grating.

19. The system of claim 11, further comprising:
    a substrate;
    a buried-oxide layer disposed on the substrate; and
    a semiconductor layer disposed on the buried-oxide layer, wherein the optical device is included in the semiconductor layer.

20. A method for multiplexing or de-multiplexing an optical signal, wherein the method comprises:
    receiving the optical signal via an optical waveguide;
    conveying the optical signal through a propagation region, wherein the propagation region includes a two-dimensional pattern of features in which a given feature has a characteristic length and the features have an average pitch, and wherein the characteristic length and the average pitch are less than a smallest wavelength of the optical signal divided by an effective index of refraction of the propagation region;
    imaging and diffracting the optical signal using an optical device having a reflective geometry;

conveying the imaged and diffracted optical signal through the propagation region; and outputting the imaged and diffracted optical signal at additional optical waveguides.

\* \* \* \* \*

UNITED STATES PATENT AND TRADEMARK OFFICE
CERTIFICATE OF CORRECTION

PATENT NO.         : 8,885,996 B2
APPLICATION NO.    : 13/551432
DATED              : November 11, 2014
INVENTOR(S)        : Li et al.

Page 1 of 1

It is certified that error appears in the above-identified patent and that said Letters Patent is hereby corrected as shown below:

In the Specification

In column 4, line 14, delete "Xs" and insert -- $\lambda$s --, therefor.

Signed and Sealed this
Twenty-third Day of June, 2015

Michelle K. Lee
*Director of the United States Patent and Trademark Office*